UNITED STATES PATENT OFFICE.

JOHN WILLIAM COBB, OF LEEDS, ENGLAND.

PROCESS OF EXTRACTING AMMONIA AND SULFUR COMPOUNDS FROM GAS.

1,108,705.  Specification of Letters Patent.  Patented Aug. 25, 1914.

No Drawing.  Application filed May 31, 1913. Serial No. 771,066.

*To all whom it may concern:*

Be it known that I, JOHN WILLIAM COBB, a subject of the King of Great Britain, residing at Townend, Wortley, Leeds, Yorkshire, England, have invented certain new and useful Improvements in the Process of Extracting Ammonia and Sulfur Compoundes from Gas, of which the following is a specification.

The present invention relates to a process for the simultaneous extraction of ammonia and sulfur compounds from the gaseous products of the distillation or semi-combustion of coal or other carbonaceous material in retorts, coke-ovens, gas producers, blast furnaces and the like, and the preparation of ammonium sulfate from the ammonia and sulfur compounds so extracted.

The invention has particular reference to a process of the kind in which the gases are washed with solutions or suspensions of compounds of metals and in which the sulfids formed therefrom are filtered off, and ammonium salts are recovered from the filtering. Numerous attempts have been made to carry out this process mostly with imperfact results, and to utilize its products, such as by calcining or roasting the metallic sulfids formed therein with the view of converting their sulfur content into sulfur dioxid, treating such sulfids in suspension with sulfur dioxid and air to regenerate the sulfates, and the thionates; or calcining carefully at a low temperature the sulfids of copper, lead, magnesium, zinc, or other metals precipitated by the gases to obtain sulfates to be used again in solution to treat fresh quantities of gas. In this last case it is very difficult to oxidize zinc sulfid into zinc sulfate, without losing appreciable quantities of sulfur; the conversion into sulfate is never complete, and the product which remains is unsuitable for the treatment of the gases. Another attempt has consisted in treating the zinc sulfid resulting from such a process with sulfuric acid, burning the sulfureted hydrogen evolved, transforming the sulfur dioxid so formed to sulfuric acid, and using the zinc sulfate over again in the treatment of the gases. This process, however, besides being very tedious, has the drawback that tar, which it is impossible to remove from the gases, is not destroyed during the process and interferes with the reaction; moreover, the use of acid necessitates the employment of lead-lined vessels.

The present invention aims at overcoming the disadvantages of the prior processes, and obtaining, by means of a comparatively small plant, a large output and economical working.

According to my said invention, the gas is washed in a known manner with a solution of a metallic sulfate from which sulfureted hydrogen will precipitate the corresponding sulfids in neutral or alkaline solution, the sulfid is filtered off, and ammonium sulfate is recovered from the filtrate. The sulfid so obtained I then roast under such conditions that the resulting calcined product is in the best form for combining with sulfurous acid and oxygen to form metallic sulfate; the sulfurous gases formed being suitably collected. The residue from the roasting or the portion therein insoluble in water is suspended in water through which sulfurous gases from a subsequent roasting are passed. Air is also blown through the liquid, and in this manner metallic sulfate is regenerated which is used again for further treatment. It will be seen that the regeneration of the metallic sulfate is effected in such a manner that it is free from deleterious tar contamination.

I will now describe the process in greater detail with reference to various suitable salts. A solution of zinc sulfate is suitable. The liquor resulting after washing the gas is filtered, when the ammonia of the gas is obtained in the filtrate as ammonium sulfate, and the corresponding sulfur in the precipitate along with the zinc. The filtrate is evaporated to recover the ammonium sulfate in crystals. The precipitate is roasted in a controlled current of air. A proportion, but not the whole, of the residue is sulfate; some gaseous products of the roasting, including sulfur oxids, are evolved. The solid residue, or the portion thereof insoluble in water, (to which the solid residue from one or more previous roastings may be added) is then suspended in water. The roasting gases from the same or a subsequent roasting are passed through this suspension. Absorption of the sulfurous gases results. Any sulfurous gases escaping from the suspension may be re-circulated by turning them into the air supply of the roaster in which the zinc sulfid is roasted. Passage of air through the suspension may be continued after the evolution of the sulfurous gases from the roasting has ceased, to further oxidation and solution. The suspension resulting from the above-mentioned absorption of sulfurous gases is allowed to settle or is filtered; the filtrate contains zinc sulfate which is used again for washing the gas; thus the sulfur of the gas is obtained successively as zinc sulfid, zinc sulfate and ammonium sulfate. The solid residue from the absorbing suspension is used again in the absorbing process.

It is advisable that the roasting should be done at a controlled low temperature, about 500° C. being suitable. This temperature is high enough either to destroy the tar in the product to be calcined, or to so alter it in character by volatilization, some combustion and carbonization, that it is no longer detrimental to the success of the process. It is advisable also to keep the absorbing suspension warm; about 80° C. is suitable. The above process may also be carried out with such sulfates, other than zinc sulfates, as allow of effective precipitation, roasting, and absorption as described.

If more sulfureted hydrogen is present in the gas than is equivalent to the ammonia present it will remain there after washing with the sulfate solution as described; it can be removed by various methods such as that of absorption by a suspension of lead sulfate. If less sulfureted hydrogen is present in the gas than is equivalent to the ammonia present the sulfur may be supplied by adding sulfur or materials containing sulfur to the precipitate which is to be roasted.

What I claim as my invention and desire to secure by Letters Patent is:—

1. A process of extracting ammonia and sulfur compounds from gas which comprises treating the gas with metal sulfate capable of being attacked by sulfureted hydrogen and forming thereby ammonium sulfate and metal sulfid; recovering the ammonium sulfate, treating the sulfid to obtain therefrom metal sulfate and oxid, treating the oxid so as to regenerate sulfate.

2. A process of extracting ammonia and sulfur compounds from gas which comprises washing the gas with water containing metal sulfate capable of being attacked by sulfureted hydrogen, forming thereby ammonium sulfate and metal sulfid, recovering the ammonium sulfate, treating the precipitated sulfid to obtain therefrom metal sulfate and oxid, and treating said mixture with air and with sulfur oxid so as to regenerate metal sulfate from the oxid.

3. A process of extracting ammonia and sulfur compounds from gas, which comprises washing the gas with water containing metal sulfate capable of being attacked by sulfureted hydrogen, obtaining the ammonium sulfate formed thereby from the liquid, roasting the precipitated sulfid to obtain a mixture of metal sulfate and oxid and treating said mixture with air and with sulfur oxid so as to regenerate sulfate from the oxid.

4. A process of extracting ammonia and sulfur compounds from gas, which comprises washing the gas with water containing metal sulfate capable of being attacked by sulfureted hydrogen to obtain ammonium sulfate and metal sulfid, recovering ammonium sulfate from the liquid, roasting or calcining the precipitated sulfid to obtain a solid residue of metal sulfate and oxid, suspending said calcined residue in water, and treating said suspension with air and with sulfur oxids to regenerate metal sulfate.

5. A process of extracting ammonia and sulfur compounds from gas, which comprises treating the gas with metal sulfate, capable of being attacked by sulfureted hydrogen, forming thereby ammonium sulfate and metal sulfid, treating said sulfid to obtain therefrom metal sulfate and oxid free from deleterious tar contamination and in such condition as to transform readily into sulfate when treated with sulfurous acid and air, and regenerating metal sulfate from the oxid.

6. A cyclic process of extracting ammonia and sulfur compounds from gas, which comprises treating such gas with metal sulfate capable of being attacked by sulfureted hydrogen and forming thereby ammonium sulfate and metal sulfid, and treating the sulfid to obtain therefrom metal sulfate and oxid in such condition as to transform readily into sulfate when treated with sulfurous acid and air for re-use in a fresh cycle.

7. A process of extracting ammonia and sulfur compounds from gas which comprises treating the gas with zinc sulfate and forming thereby ammonium sulfate and zinc sulfid, recovering the ammonium sulfate, roasting or calcining the precipitate to obtain a solid calcined residue containing zinc sulfate and oxid, and treating said calcined residue so as to regenerate sulfate from the oxid.

In testimony whereof, I have affixed my signature in presence of two witnesses.

JOHN WILLIAM COBB.

Witnesses:
WILLIAM REEVES,
CHARLES E. TAYLOR.